United States Patent [19]

Franz, Jr. et al.

[11] 4,380,724
[45] Apr. 19, 1983

[54] SHUNT FIELD CONTROL APPARATUS AND METHOD

[75] Inventors: James H. Franz, Jr., Murrysville; Stanley W. Jones, McMurray, both of Pa.

[73] Assignee: Westinghouse Electric Corp., Pittsburgh, Pa.

[21] Appl. No.: 209,762

[22] Filed: Nov. 24, 1980

[51] Int. Cl.³ ............................................. H02P 7/06
[52] U.S. Cl. ................................... 318/353; 318/331; 318/338; 318/252
[58] Field of Search ........... 318/331, 338, 341, 345 R, 318/345 E, 345 G, 353, 246, 251, 252

[56] References Cited

U.S. PATENT DOCUMENTS

| | | |
|---|---|---|
| 3,360,705 | 12/1967 | Morris ................................. 318/331 |
| 3,562,616 | 2/1971 | Elliott ............................. 318/353 X |
| 3,906,317 | 9/1975 | Narita . |
| 3,947,738 | 3/1976 | Oliver ................................ 318/341 |
| 3,983,465 | 9/1976 | Tsuboi et al. . |
| 4,019,108 | 4/1977 | Elvin ................................. 318/353 |
| 4,282,466 | 8/1981 | Matty ................................ 318/434 |
| 4,284,930 | 8/1981 | Matty ............................. 318/302 X |

Primary Examiner—B. Dobeck
Assistant Examiner—Richard M. Moose
Attorney, Agent, or Firm—R. G. Brodahl

[57] ABSTRACT

A motor control is provided for a DC series motor operative with a chopper apparatus and including a thyristor switch to determine the field shunt operation of the motor. A voltage reversal that occurs across the field windings when the chopper is OFF and not conducting is utilized to commutate and enable modulation of the field shunt thyristor switch as desired in relation to the chopper ON and OFF operation.

5 Claims, 7 Drawing Figures

4,380,724

SHUNT FIELD CONTROL APPARATUS AND METHOD

CROSS-REFERENCE TO RELATED APPLICATION

The present application is related to a patent application Ser. No. 086,380 filed Oct. 19, 1979 and entitled "Motor Control Apparatus And Method" by T. C. Matty, now issued as U.S. Pat. No. 4,284,930, and a patent application Ser. No. 902,001, filed Apr. 27, 1978, and entitled "Transit Vehicle Motor Effort Control Apparatus and Method" by T. C. Matty, now issued as U.S. Pat. No. 4,282,466, which are assigned to the same assignee as the present application and the disclosures of which are incorporated herein by reference.

The present application is related to a previously filed patent application Ser. No. 199,798 and entitled "Shunt Field Control Apparatus And Method" by J. H. Franz Jr. et. al., which is assigned to the same assignee and the disclosure of which is incorporated herein by reference.

BACKGROUND OF THE INVENTION

It is well known in the prior art to provide a field shunt operation for a transit vehicle electric motor. The motor commonly operates from zero speed up to an intermediate base speed with a full field operation to provide a desired torque in relation to a load, and when the back EMF of the motor in full field operation builds up as a function of operating speed it becomes necessary to shunt the main field winding with a shunt field for a weakened field operation to enable more armature current for holding the desired torque to operate at greater speed above that intermediate base speed. When the field shunt operation is provided, since motor torque is proportional to the field flux times the armature current, in order to provide the same desired output torque an increase in the armature current is required since the field flux is now decreased.

It is known in the prior art to control the operation of one or more transit vehicle motors with a chopper apparatus as described in U.S. Pat. Nos. 3,559,009 of J. M. Mills, 3,543,121 of L. G. Miller and 3,530,503 of H. C. Appelo et al., and in a publication entitled "Alternative Systems for Rapid Transit Propulsion and Electrical Braking" in the March 1973 Westinghouse Engineer at pp. 34–41. It is known in the prior art to provide a full field and a shunt field operation of a traction motor for the control of dynamic braking as disclosed in U.S. Pat. No. 3,569,811.

It is known in the prior art as shown by U.S. Pat. No. 4,095,153 of T. C. Matty et. al to utilize a microprocessor chopper control of regenerative brake current buildup by providing an upper current limit to control chopper ON operation and a lower current limit to control chopper OFF operation.

SUMMARY OF THE PRESENT INVENTION

For a motor control apparatus operative with a DC series motor, which includes a thyristor chopper used to regulate the motor current and a thyristor switch device to determine the field shunt operation of that motor, the voltage reversal that occurs across the motor field winding when the thyristor chopper is not conducting is utilized to turn off the field shunt thyristor to enable a desired time modulation by adjusting the turn ON of the field shunt operation during each cycle of the thyristor chopper operation.

DETAILED DESCRIPTION OF A PREFERRED EMBODIMENT

Figure 1:
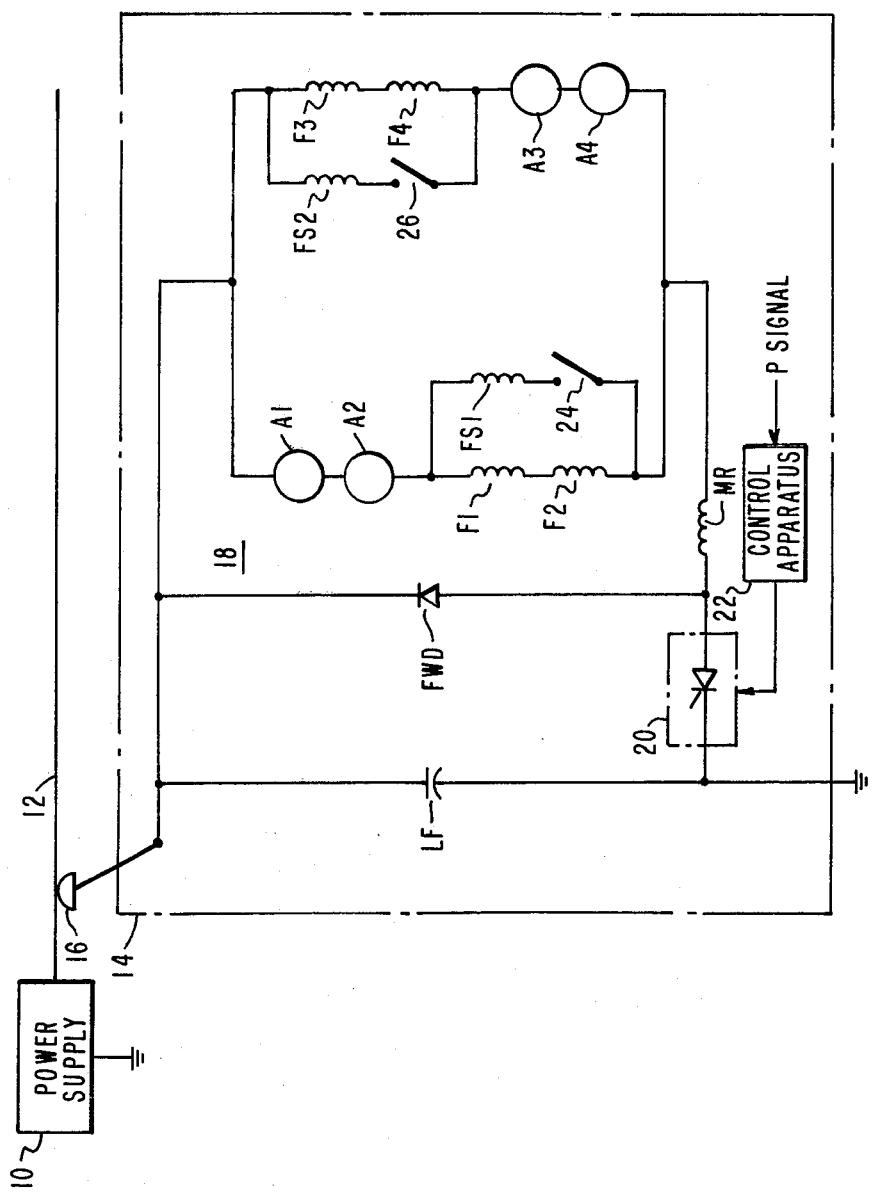
FIG. 1 shows a typical prior art motor control apparatus for a common bridge propulsion motor arrangement of a transit vehicle, having four-series DC motors and utilizing mechanical switches to provide a field shunt operation of those motors when desired.

In FIG. 1 there is shown a prior art circuit arrangement for providing a field shunt operation for transit vehicle DC series traction motors. A voltage supply 10, which may be a rectifier operative with an AC source, feeds a power line 12 operative with the transit vehicle 14. A sliding trolley contact 16 operates with a propulsion control system 18 including a chopper 20 used to regulate the current in the motor circuits. A suitable control apparatus 22 can be provided to control the operation and duty cycle of the chopper 20. A line filter capacitor LF is provided to reduce the noise disturbance fed back to the supply line 12 because of the chopper operation. Four traction motors are shown connected, two in series, and the two groups of two motors being connected in parallel, with the motor armatures A1 and A2 shown connected in series with the related fields F1 and F2 and the motor armatures A3 and A4 shown connected in series with the related fields F3 and F4. The freewheeling diode FWD and the motor reactor MR are shown in the circuit. Turning the chopper 20 ON builds up current in the motors by completing the circuit from the power supply 10 positive through the motors to ground. When the chopper 20 is turned OFF, the energy stored in the motor reactor MR and the inductance of the motors maintains current flow in the motor circuit through the loop including the freewheeling diode FWD. The average voltage applied to the motors is controlled by adjusting the ratio of chopper OFF time to ON time. This adjustment is made by the chopper control logic apparatus 22 operative with the chopper 20 to maintain the desired motor current and motor torque in response to the acceleration request P signal. The control apparatus 22 can include a well-known Intel 8080 microprocessor having an operating frequency of about 218 Hz. A shunt field FS1 is connected with a mechanical switch 24 to shunt the motor fields F1 and F2. A shunt field FS2 is connected with a mechanical switch 26 to shunt the motor fields F3 and F4. The control apparatus 22 can be connected if desired through relay actuator devices or similar apparatus with the switches 24 and 26 to determine the provision of the field shunt operation with each of the shunt fields FS1 and FS2.

Figure 2:
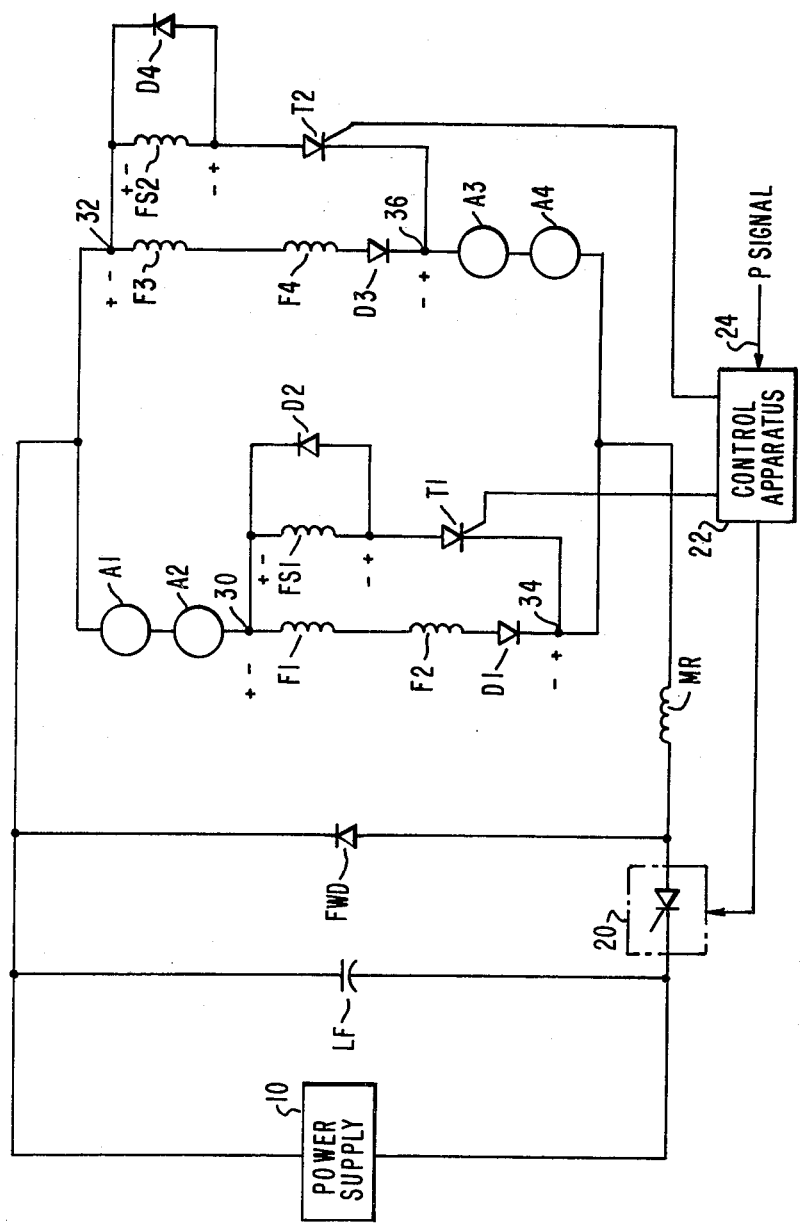
FIG. 2 shows the motor control apparatus of the present invention for providing an improved field shunt operation of such a bridge propulsion motor arrangement of four-series DC motors.

In FIG. 2 there is shown the motor control apparatus of the present invention for providing a field shunt operation of a bridge arrangement of four-series DC motors, such as shown in FIG. 1. The circuit components of FIG. 2 that are common to the motor control apparatus of FIG. 1 are indicated by similar designations.

It was the prior art practice for a shunt field operation of series DC motors such as shown in FIG. 1 to provide a shunt connection around the motor fields as determined by the closing of mechanical contactors, and as would be provided in FIG. 1 by the closing of the contactors 24 and 26. The prior art practice was to go from no field shunt with the mechanical contactors 24 and 26 open to a field shunt when the contactors 24 and 26 were closed. Once the contactors 24 and 26 were closed they were left closed until the field shunt operation was no longer desired.

In FIG. 2 the mechanical contactors have been replaced by thyristor switch devices T1 and T2 for determining the field shunt operation when desired. When the chopper 20 is ON motor current will flow through each of the branches, with the first branch including the motor armatures A1 and A2 and the motor fields F1 and F2 and with the second branch including the motor armatures A3 and A4 and the motor fields F3 and F4. When it is desired to provide a field shunt operation with the chopper 20 ON and conducting, at sometime subsequent to the firing of the main thyristor of chopper 20 each of the field shunt thyristors T1 and T2 can be fired to provide the required field shunt operation to obtain the desired motor torque in accordance with the torque request P signal 24 supplied to the control apparatus 22.

The chopper 20 regulates the current in each branch of the motor circuits by operating in ON and OFF conducting periods for each desired duty cycle of the chopper 20. Turning the chopper 20 ON builds up current in the motor circuits, and when the chopper 20 is turned OFF the energy stored in the motor reactor and the inductance of the motor fields maintains a current flow in the motor circuit through the loop including the freewheeling diode FWD. The average voltage applied to the motors is controlled by adjusting the ratio of the chopper 20 OFF time to the ON time.

For each ON conduction of the chopper 20 the terminal 30 and the terminal 32 become positive relative to the respective terminals 34 and 36. And when the chopper 20 is OFF, the terminals 30 and 32 become negative relative to the respective terminals 34 and 36 since the field windings have inductance. The voltage polarities do not switch across the motor fields after the main thyristor turns OFF until the motor reactor MR current falls below the current previously supported by the motor fields. When the field shunt thyristor is conducting the motor reactor MR current divides with one branch passing through the motor fields and the other branch passing through the shunt field. When the thyristor 20 is turned OFF, the free wheeling diode FWD provides a current path to reverse the voltage polarities, as shown to the right in FIG. 2, after the motor reactor MR current becomes substantially the same as the current flowing in the motor fields. The current in the motor fields tends to more or less stay the same after thyristor 20 turns OFF until the motor reactor MR current is about equal to this motor field current, when the motor reactor MR current and the current through the motor fields will then come down together. The voltage polarity across the shunt field changes polarity when the motor reactor MR current and the current of the motor fields are substantially the same, and this voltage polarity change will self commutate the shunt field thyristor. It may be desirable and is within the scope of the present invention to slap one ON pulse for the main thyristor 20 in relation to the shunt field thyristor becoming self-commutated, depending upon the magnitude of the motor reactor MR current in relation to the magnitude of the current of the motor fields.

The motor armatures provide a back EMF voltage, and when the chopper 20 is not conducting the back EMF voltage is greater than the line voltage applied to the circuit such that when the chopper 20 is OFF and is not conducting the voltage across the field windings F1 and F2 and the voltage across the field windings F3 and F4 will reverse, with the current continuing to flow through the field windings in the same direction and with the voltage across those field windings changing polarity. The current flowing through the field shunt will operate to hold the respective thyristors T1 and T2 conducting after the field shunt has been provided by the conduction of those thyristors. In relation to field shunt FS1 the diode D2 is connected to provide a current path around the field shunt FS1 in relation to the voltage across the field shunt FS1, and the diode D4 is connected across the field shunt FS2 to provide a current path around the field shunt FS2 in relation to the voltage across the field shunt FS2.

The thyristor T1 has about a 1.6 volts drop when it is conducting and the associated field windings F1 and F2 have very little resistance, so an equalizing diode D1 can be provided to block and keep the thyristor drop voltage away from the field windings F1 and F2. Similarly, the thyristor T2 has a corresponding voltage drop when it is conducting and the equalizing diode D3 can be provided to block and keep the thyristor drop voltage away from the field windings F3 and F4.

The negative voltage at terminal 30 can be used to turn OFF the thyristor T1. This permits removing the field shunt during any one or more cycles of operation of the chopper 20 which can operate at a 218 Hz cycle rate In effect, this provides desired time modulation of the field shunt operation provided by the thyristor T1. Thusly, any time the chopper 20 is ON the field shunt thyristor T1 can be turned ON, and anytime the chopper 20 is OFF and the current of the motor reactor has fallen to substantially the current of the motor fields, the field shunt thyristor T1 can be turned OFF. The other field shunt thyristor T2 can be similarly operated in relation to the chopper 20. A variation in the conduction angle of each field shunt thyristor, such as the field shunt thyristor T1, can be provided by delaying the ON operation of the field shunt thyristor in relation to the ON and OFF duty cycle of the main chopper 20.

The diode D2 is provided since the field shunt winding FS1 is an inductor and the diode D2 is provided to prevent the field shunt FS1 from keeping current flowing in the control thyristor T1.

When the vehicle associated with the motor control apparatus shown in FIG. 2 is moving along a roadway track in the motoring or power mode operation, if the P signal 24 provides an acceleration request when the operating speed of the vehicle is above the base speed of the propulsion motors the field shunt thyristors T1 and T2 can be turned ON to provide a field shunt operation to reduce the field flux of the respective motors and thereby reduce the back EMF voltage of those motors to allow more current in the motor circuits for acceleration of the vehicle.

Figure 5:
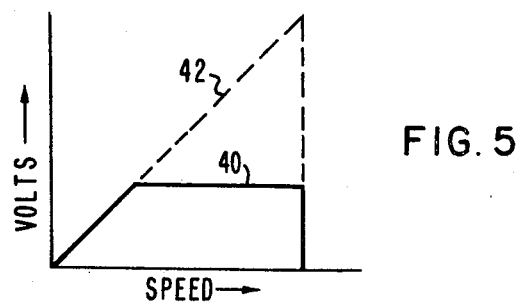
FIG. 5 shows the lower current power mode operation of the motor control apparatus shown in FIG. 3 as compared to the brake mode operation, and of this motor control apparatus.

In the brake mode of operation during the initial high current condition it is not desired to stop the field shunt operation until the current is reduced to a level where it is proper to remove the field shunt. The problem in braking is the generation of too many volts. As shown in FIG. 5, for the power mode of operation the motor current cannot be held at full speed since the line voltage is relatively limited to a known voltage in relation to the back EMF of the motor. In braking mode the motor acts as a self excited generator and the current can be held at higher speed and therefore more voltage is provided which is higher than line voltage because full current is held at full speed. During the brake mode of operation the motor curve comes down in a substantially linear relationship, and it is desirable to operate initially in weak field and high current condition, and when the motor voltage is reduced it becomes appropriate to discontinue gating the shunt field thyristors. The thyristors T1 and T2 shown in FIG. 2, when no longer gated ON by the control apparatus 22, will self-commutate to turn OFF and the motor circuit changes to full field operation, with the brake operation then being provided on down the current curve in the full field operation. In this way the main chopper 20 provides the desired motor current modulation and the shunt field thyristor T1 provides voltage modulation when desired to turn OFF the shunt field thyristor T1.

Figure 3:
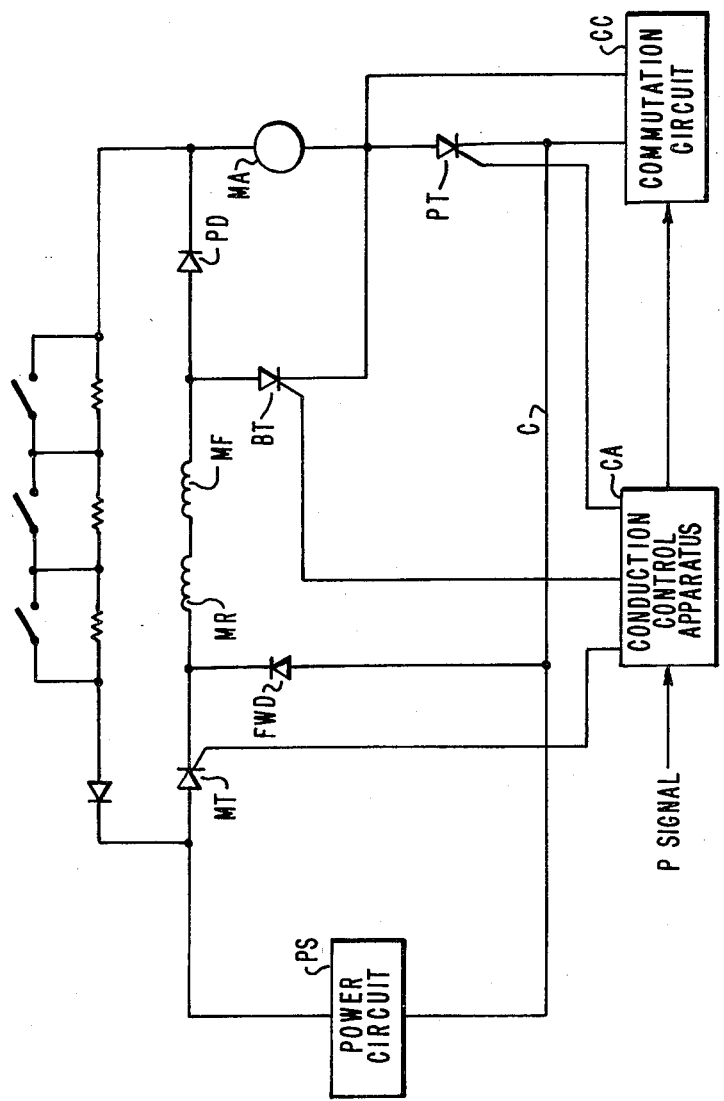
FIG. 3 shows a prior art motor control apparatus for a series DC motor and utilizing solid-state switch devices to determine a desired one of a power or brake mode of operation.

In FIG. 3 there is shown motor control apparatus in accordance with the disclosure of the above cross-referenced pending application Ser. No. 086,380, for determining the average current supplied from a direct current power supply PS to a direct current motor including the armature MA and the field MF and including a series main thyristor MT that repetitively operates in an ON condition and an OFF condition to chop and regulate the voltage applied to the motor armature MA. The control of this voltage is determined by changing the ON operation time in relation to the OFF operation time of the conduction by the main thyristor MT for controlling the speed of the motor. The speed of a DC series field traction motor is determined by the armature voltage. The main thyristor MT is gated by a well-known conduction control apparatus CA, in response to the P signal effect request, to be ON and become conductive and then is commutated to be OFF and become not conductive, as required to provide a desired average voltage across the motor armature MA which determines the motor speed. Each time the main thyristor MT conducts, the voltage across the motor armature MA and the motor reactor MR rises toward the voltage of the power supply PS. Each time the main thyristor MT blocks, the voltage across the motor armature MA and motor reactor MR falls toward zero. The main thyristor MT determines the average motor voltage. If the main thyristor MT remains ON and conductive for a a longer time, this raises the average motor voltage and if the main thyristor remains OFF and blocked for a longer time, this lowers the average motor voltage.

A power thyristor PT is made conductive when it is desired for the motor circuit to operate in the power mode for the propulsion of the vehicle coupled with the motor armature MA. A power diode PD and a motor field MF are connected in the power mode circuit including the power thyristor PT, the return conductor C, the voltage source PS and the main thyristor switch MT. A brake thyristor BT is made conductive when it is desired for the motor circuit to become operative in the brake mode. A commutation circuit CC is provided to terminate the conduction of the power thyristor PT when it is desired for the motor circuit to operate in the brake mode, with the brake current flowing through the motor armature MA.

Figure 4:
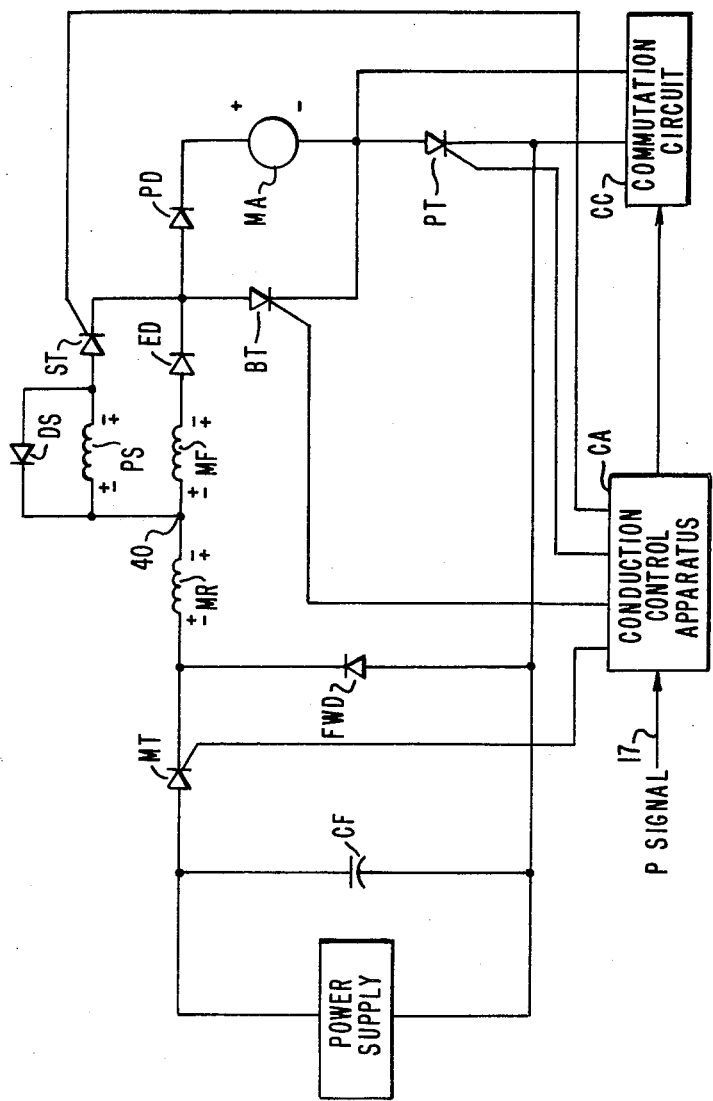
FIG. 4 shows the motor control apparatus of the present invention for providing an improved field shunt operation with the motor control apparatus shown in FIG. 3.

In FIG. 4 there is shown the motor control apparatus of the present invention providing a field shunt operation with the series DC motor control apparatus such as disclosed in FIG. 3. The field shunt winding FS is shown connected around the motor field MF through a shunt control thyristor ST, which is controlled in its ON and OFF operations by the conduction control apparatus CA. A shunt diode DS is connected around the shunt field FS and the equalizing diode ED is provided in series with the motor field MF to keep the drop voltage of the thyristor ST away from the field winding MF. When the main thyristor MT is conducting, the inductors including the motor reactor MR and the motor field MF and the field shunt FS have a positive voltage appearing across them as indicated by the upper polarity markings shown in FIG. 4. When the main thyristor MT is not conducting, the voltage polarity across each of these inductors will change as indicated by the lower polarity markings provided adjacent each of these three inductors. The armature back EMF appears like a battery voltage having a polarity as indicated adjacent the motor armature MA. When the main thyristor MT is OFF and nonconductive the armature voltage is going to remain the same and, therefore, the inductors have to reverse polarity in order to maintain the current flow through the freewheeling diode FWD. The negative voltage appearing at terminal 40, when the main thyristor MT is OFF and the current of the motor reactor has fallen to substantially the current of the motor fields, can be used to turn OFF the thyristor ST to permit removing the field shunt during any one or more ON/OFF cycles of the 218 Hz main thyristor MT operation, as determined by the conduction control apparatus CA. In effect, this provides a time modulation of the field shunt operation. Thusly, anytime the main thyristor MT is ON, the field shunt thyristor ST can be turned ON and anytime the main thyristor is OFF and the current of the motor reactor has fallen to substantially the current of the motor fields, the field shunt thyristor ST can be turned OFF. Any desired variation in the conduction angle of the field shunt thyristor ST can be provided by delaying either the ON or the OFF operation of the field shunt thyristor ST as desired.

Figure 6:
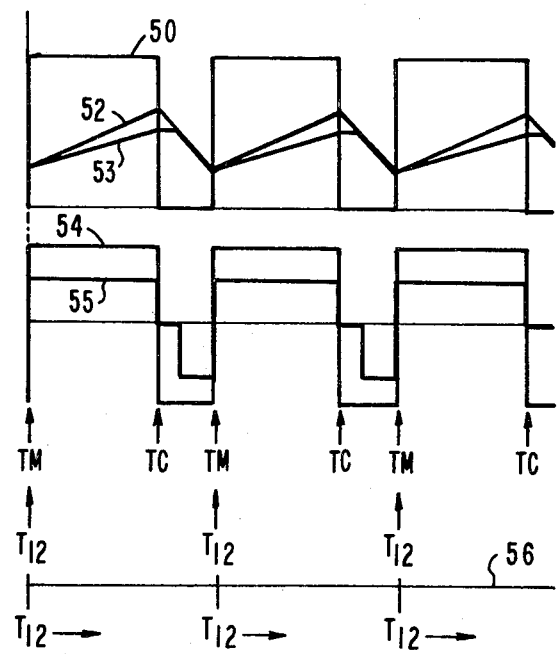
FIG. 6 shows the control operation provided by the conduction control apparatus for determining the operation of the motor current control chopper apparatus in relation to the field shunt control thyristors of the present invention.

In FIG. 6, there are shown the control operations provided by the control apparatus 22 of FIG. 2 for determining the operation of the chopper 20 and the field shunt thyristor switch devices T1 and T2. It is within the routine knowledge of persons skilled in the microprocessor chopper motor control art to provide the necessary control signals from the control apparatus 22 for the chopper apparatus 20 and the field shunt control thyristor switches T1 and T2 as shown in FIG. 2.

The curve 50 of FIG. 6 shows the ON and OFF voltage operation of the chopper 20 to provide the duty cycle desired by the effort request P signal. The curve 52 shows the resulting motor reactor current provided by the operation of the chopper 20. The curve 53 shows the current of the fields F1 and F2, which rises when the motor reactor MR current is rising. When the main thyristor 20 is turned OFF the current of fields F1 and F2 holds about constant while the current of the motor reactor MR falls off to the value of this field current, and then this field current falls off with the motor reactor current until the main thyristor 20 is again turned ON. The curve 54 shows the voltage across motor reactor MR. The curve 55 shows the voltage across the fields F1 and F2, which is positive while the main thyristor 20 is ON and then goes to zero until the motor reactor MR current shown by curve 52 is substantially the same as the field current shown by curve 53, when the voltage becomes negative to self commutate the field shunt thyristor T1. When the main chopper 20 is ON the terminals 30 and 32 will be positive relative to the respective terminals 34 and 36 and when the main chopper 20 is OFF and the current of the motor reactor has fallen to substantially the current of the motor fields, the terminals 30 and 32 will be negative relative to the respective terminals 34 and 36, as shown in FIG. 2. The main chopper 20 is turned ON at time TM and turned OFF at time TC. When a field shunt operation is desired for the complete duration of the ON operation of chopper 20, the field shunt switches T1 and T2 are turned ON at time $T_{12}$ shown above the line, and if less time duration of field shunt operation is desired this can be provided by moving the turn ON time $T_{12}$ of thyristor switches T1 and T2 to the right as shown in FIG. 6 below the line 56 to provide the desired modulation of the field shunt operation.

Figure 7:
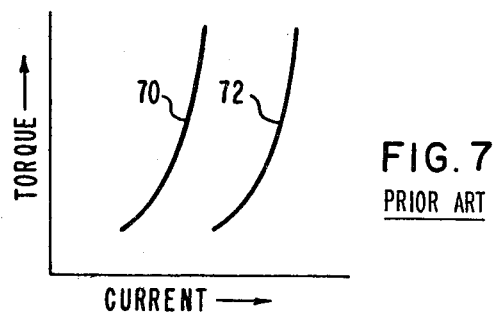
FIG. 7 shows the well-known torque versus current operational characteristic curves of a DC series motor.

In FIG. 7 there is shown the well-known torque versus current motor operational characteristics, with the curve 70 showing the full field operation and the curve 72 showing the shunt field operation. The typical shunt field operation of a DC series propulsion motor is provided when the chopper ON portion of the duty cycle is greater than 50% and even close to full ON, since the longer chopper ON portion increases the ability of the shunt field to control the motor operation. The resistance value of the shunt field determines the percentage of motor current passing through the main field during a shunt field operation. If the shunt field thyristor switch T1 is ON for the full duration of the chopper ON operation, a typical shunt field selection might provide 25% of the motor current through the main field. Then as the ON operation of the shunt field is decreased in relation to the chopper ON operation, by modulating the shunt field and moving the turn ON time $T_{12}$ of the thyristor switches to the right as shown in FIG. 6, this shifts the shunt field curve 72 toward the full field curve 70.

We claim:

1. In shunt field control apparatus for a motor operative with a voltage supply and having a shunt field and a series connected armature and main field, the combination of chopper means coupled between the voltage supply and the series connected armature and main field, said chopper means having successive ON and OFF operations to determine the average voltage across the series connected armature and main field and providing a predetermined polarity voltage across the main field during each of said OFF operations, switch means coupled with the shunt field and conductive for connecting the shunt field across the main field, and means connected across the shunt field for providing a current path around the shunt field in relation to voltage across the shunt field and providing said predetermined polarity voltage across the switch means to turn OFF the conduction of the switch means.

2. The control apparatus of claim 1,
with the means connected across the shunt field providing a conduction path for any voltage across the shunt field having said predetermined polarity.

3. The control apparatus of claim 1,
with the means connected across the shunt field comprising a diode.

4. In a method of control for a motor connected with a motor reactor and having an armature, a main field and a shunt field, the steps of providing a first voltage across said motor reactor, said armature and said main field for successive ON and OFF operational time periods to determine the average energization of that armature and main field, providing a predetermined polarity second voltage across the main field during said OFF time periods, connecting the shunt field across the main field when a shunt field operation of the motor is desired, and applying said predetermined polarity second voltage to disconnect the shunt field from across the main field during said OFF time periods when the current of the motor reactor has fallen to substantially the current of the motor fields.

5. The method of claim 4, including the step of
providing a conductive path around the shunt field in relation to any voltage across the shunt field having said predetermined polarity.

* * * * *